US005448698A

United States Patent [19]

Wilkes

[11] Patent Number: 5,448,698
[45] Date of Patent: Sep. 5, 1995

[54] INTER-PROCESSOR COMMUNICATION SYSTEM IN WHICH MESSAGES ARE STORED AT LOCATIONS SPECIFIED BY THE SENDER

[75] Inventor: Andrew J. Wilkes, Palo Alto, Calif.

[73] Assignee: Hewlett-Packard Company, Palo Alto, Calif.

[21] Appl. No.: 42,957

[22] Filed: Apr. 5, 1993

[51] Int. Cl.6 .............................................. G06F 12/02
[52] U.S. Cl. .............................. 395/200.01; 364/284.3; 364/245.9; 364/246.9; 364/DIG. 1; 364/966.8; 364/969.4; 364/DIG. 2; 395/187.01; 370/13
[58] Field of Search ................. 395/200, 325, 425, 575

[56] References Cited

U.S. PATENT DOCUMENTS

| | | | |
|---|---|---|---|
| 4,774,707 | 9/1988 | Raychaudhuri | 370/95 |
| 4,802,220 | 1/1989 | Marker, Jr. | 380/33 |
| 5,048,085 | 9/1991 | Abraham et al. | 380/23 |
| 5,243,643 | 9/1993 | Sattar et al. | 379/88 |
| 5,347,514 | 9/1994 | Davis et al. | 370/60 |

OTHER PUBLICATIONS

Kronenberg et al., "VAXclusters: A Closely-Coupled Distributed System"; ACM Transactions on Computer Systems, vol. 4, No. 2, May 1986, pp. 130–146.
Wenzel, "IEEE-P1212.1: Standard for Communicating Among Processors and Peripherals Using Shared Memory (DMA)".
Spector, "Performing Remote Operations Efficiently on a Local Computer Network", Communications of the ACM, vol. 25, No. 4, Apr. 1982, pp. 246–260.
Rosing et al., "Reducing Message Latency by Making Message Passing Transparent", Proceedings of the Hawaii International Conference on System Sciences (IEEE), vol. 1, 1992, pp. 593–599.
Xerox System Integration Standard 038122, Addendum to *Courier: The Remote Procedure Call Protocol*, Appendix F, "Bulk Data Transfer", Apr. 1984, pp. 35–47.
von Eicken et al., "Active Messages: a Mechanism for Integrated Communications and Computation", The 19th Annual International Symposium on Computer Architecture, ACM SIGARCH Computer Architecture News, vol. 20, No. 2, May 1992, pp. 256–266.

*Primary Examiner*—Ken S. Kim

[57] ABSTRACT

An interconnect interface for connecting a host computer to an interconnect fabric in a multi-computer data processing system including a plurality of host computers. A sending process having permission to send messages to a receiving process on another computer in the system controls a portion of the computer memory on the computer running the receiving process. The location of the memory in question together with a protection key value are stored in a table in the receiving terminus of the interconnect interface on the recipient. The sending terminus of the interconnect interface on the computer running the sending process incorporates information in each message packet which specifies an entry in this table. Each message also includes a protection key that must match the corresponding entry in the table on the receiving terminus.

12 Claims, 4 Drawing Sheets

INTER-PROCESSOR COMMUNICATION SYSTEM IN WHICH MESSAGES ARE STORED AT LOCATIONS SPECIFIED BY THE SENDER

FIELD OF THE INVENTION

The present invention relates to data processing systems, and more particularly, to an improved communication system for use in multi-processor data processing systems.

BACKGROUND OF THE INVENTION

One class of multi-processor data processing systems consists of a plurality of processor nodes connected by an interconnect fabric. Each processor node typically includes a processor and local RAM. A high-speed interconnect fabric supports communication between nodes. A computational problem may be divided between a plurality of the nodes to improve the efficiency of the computation by making use of special resources available at different nodes or to improve the real time that must elapse before a result is available. Hence, a process running on one node may depend on computations being performed at other nodes in the system. The various processes communicate over the interconnect fabric to exchange information and synchronize the processes.

The level of performance of such a system depends on the speed with which messages can be sent from a process running on a first node to a process running on a second node. Each node typically includes an interface circuit which supervises the transmission and reception of messages. In prior art communication systems, the node receiving the message controls whether or not the message is received. When a process on the first node wishes to send a message to a process on the second node, the interface circuit on the first node sends the message over the interconnect fabric and waits for an acknowledgment from the interface circuit at the second node.

When the message reaches the interface circuit on the second node, there are two possibilities, the message is accepted or the message is lost. If the node is too busy or too full to process the message, the message is lost. The recipient may return a message indicating the loss of the message or just remain silent. In either case, the sender must resend the message at some later time. Unfortunately, the sender has no method to determine the optimum time at which to attempt another transmission, since the optimum time requires a knowledge of the processes running on the recipient node, and these processes are not visible to the sender. As a result, the sender is typically programmed to wait for some predetermined time and then attempt another transmission. If the sender initiates the transmission too soon, the recipient may still be busy and the message will again be lost. Each time the message is sent and lost, the efficiency of usage of the interconnect fabric is reduced. This reduced efficiency may cause other processes running on other nodes to run more slowly because these other processes can not access a sufficient bandwidth in the interconnect fabric to run at maximum speed. If the sender waits too long before resending the message, then the processes on the sender may run at less than maximum speed because it is stalled waiting for a return message from the second node containing the results of a delegated task that was the subject of the first message.

Even if the message is accepted by the second node, this prior art method of communication is still inefficient. When a message arrives at the recipient, the interface circuit at the recipient interrupts the processor to inform the processor of the need to deal with an incoming message. If the message is long, it will typically be broken into blocks. The arrival of each block typically generates a separate interrupt. Processing these interrupts can cause a significant reduction in the processor throughput in those cases in which the processor is busy with other tasks. In principle, the interrupts associated with a long message broken into blocks can be avoided by using interface circuits having buffers sufficient to store the largest message. However, such systems still interrupt the processor once per message. In addition, the recipient typically spends a significant amount of processor time determining where incoming messages should be placed in the recipient's local memory and in moving the messages to their destinations in the recipients memory.

This type of prior art system is also inefficient from the sender's point of view. First, each time a process wishes to send a message, it must do so by invoking an operating system call. When multiple processes are running on a single node, there is always the possibility of one process corrupting resources used by another process. Such corruption is possible if one process has unrestricted access to the interface circuit and/or interconnect fabric. In addition, protection must be provided against a process on a first node "attacking" a process on a second node or dominating the interconnect fabric. In the prior art, these protections are typically built into the operating system. On the recipient side of the communication, the operating system tests for permission to write into the recipients memory. On the sender side, the operating system stops one process from masquerading as another process. Unfortunately, operating system calls slow down the communication processes.

Another problem with prior art systems is the vulnerability of a new processor node when it first comes on-line. When a new processor is added to the multiprocessor system, it starts in an unprotected state. During this time, it can become erroneously loaded and effectively disabled. No solution to this problem is available in the prior art.

Yet another problem with prior art interconnect systems is the lack of a method for providing low-latency synchronization of processes using the same interconnect fabric that carries regular messages. It is often important to synchronize processes running on different nodes. For example, there are many applications in which only one process at a time can be given permission to change a data value used by all of the processes. In prior art systems, synchronization is either provided through a separate interconnect fabric or via operating system calls. The former solution significantly increases the cost of interconnect fabric hardware, and the later solution is too slow for many applications.

Broadly, it is the object of the present invention to provide an improved multi-computer interconnect system.

It is a further object of the present invention to provide an interconnect system in which the number of messages lost because the recipient is busy is significantly reduced compared to prior art systems.

It is a still further object of the present invention to provide an interconnect systems in which recipient is not interrupted by incoming messages when it is already busy.

It is yet another object of the present invention to provide an interconnect system in which operating system systems calls are not needed while sending messages to protect each process from accidental or malicious attacks from another process running on the system.

It is a still further object of the present invention to provide an interconnect system which reduces the amount of time a recipient spends determining where to put an incoming message in the recipients memory.

It is yet another object of the present invention to provide an interconnect system that provides an integrated, protected, low-latency synchronization operation that uses the same interconnect fabric as used for regular message traffic.

These and other objects of the present invention will become apparent to those skilled in the art from the following detailed description of the invention and the accompanying drawings.

SUMMARY OF THE INVENTION

The present invention is an interconnect interface for connecting a host computer to an interconnect fabric in a multi-computer data processing system including a plurality of host computers. The host computers are connected to an interconnect fabric over which the host computers communicate with each other. Each host computer communicates with other host computers having similar interconnect interfaces by sending and receiving messages on the interconnect fabric. Each message includes one or more packets, each packet including a packet body, packet identification information, a protection key, and a slot identification value. The interconnect interface includes a receiving terminus and one or more sending termini. The receiving terminus receives messages from the other computers connected to the interconnect fabric. The receiving terminus includes a slot table for storing a plurality of records, each record corresponding to a possible one of the slot identification values included in messages sent on the interconnect fabric. Each record includes information identifying the location and size of a corresponding area in the memory of the host computer. This area of memory is used for storing received messages having the corresponding slot identification value. Each record also includes a protection key and information specifying the structure of incoming messages. The protection key in an incoming message referencing a given record must match the protection key stored in the record. A receiving terminus stores a packet received over the interconnect fabric in the memory area of the host computer identified in the record corresponding to the slot identification value in the incoming message if the protection key in the packet matches the protection key stored in the record. The receiving terminus also includes a plurality of lists for storing information specifying received messages that are awaiting processing by the host computer.

A sending terminus is used to send a message on the interconnect fabric. Each sending terminus includes a protection register for storing a send protection key to be included in packets of messages send by the terminus. Each terminus is provided with information on the location of a message to be sent on the interconnect fabric and the intended recipient of the message. The sending terminus generates the packets for the message and sends packets over the interconnect fabric. Each packet includes the send protection key. In the preferred embodiment of the present invention, the register in which the protection key is stored may only be written by the operating system.

DETAILED DESCRIPTION OF THE INVENTION

Figure 1:
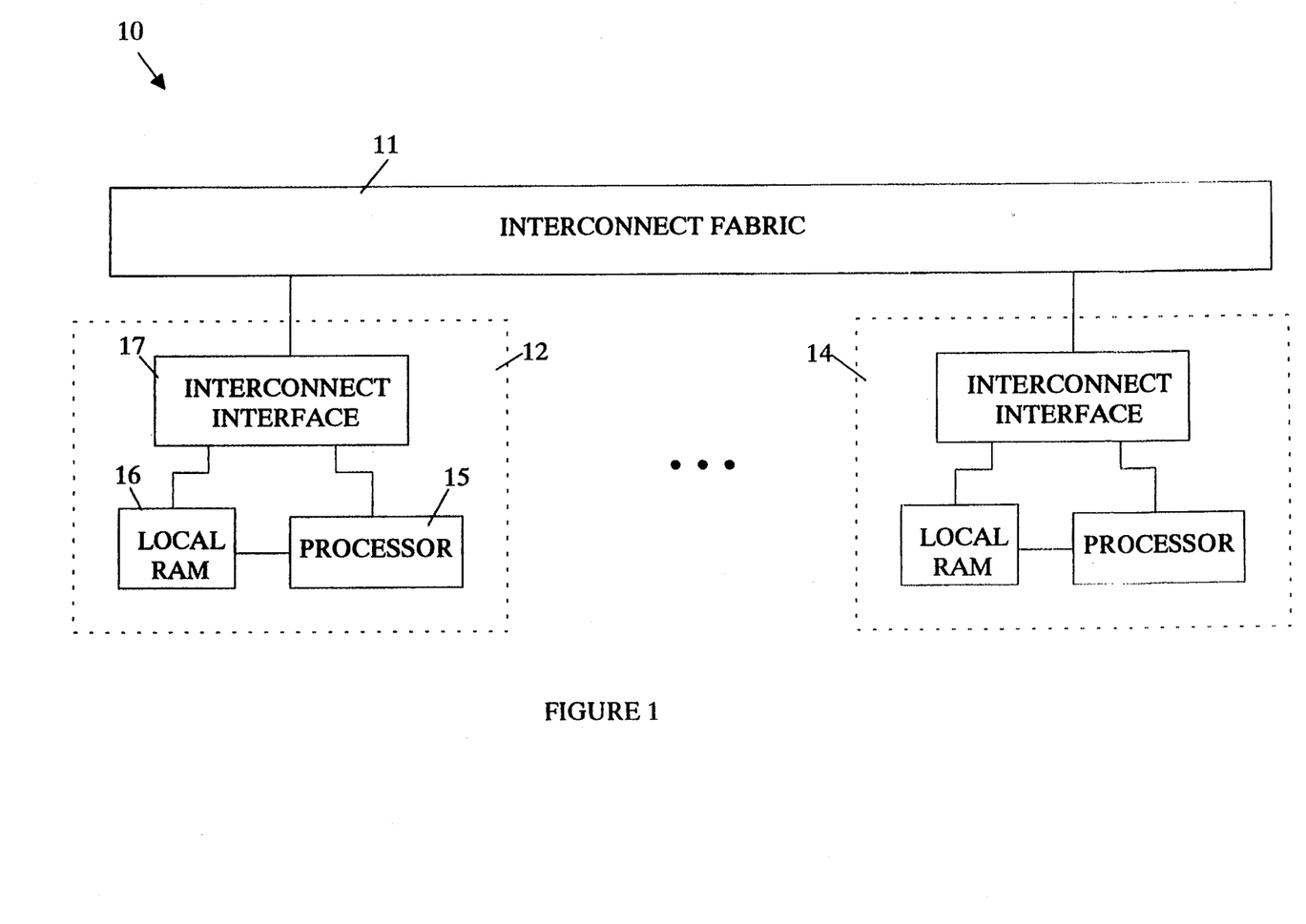
FIG. 1 is a block diagram of a typical multi-processor system that utilizes an interface system according to the present invention.

FIG. 1 is a block diagram of a typical multi-processor system that utilizes an interface system according to the present invention. Data processing system 10 includes a plurality of processor nodes. Exemplary nodes are shown at 12 and 14. Each node includes a processor 15 having local RAM 16. The processor in a given node communicates with processors in other nodes via an interconnect fabric 11. A variety of interface fabric designs are known to the art. For the purpose of this discussion, it is sufficient to note that interconnect fabric 11 provides a path from a sending node to a receiving node. Each receiving node is connected to the interconnect fabric via an interconnect interface 17.

One key difference between the present invention and prior art interconnect interfaces lies in the identity of which interconnect interfaces controls a communication between a sender and a receiver. In prior art designs, the receiver controls whether or not a message is successfully delivered to the receiver and where in the receiver's memory the message is placed. In general, each interface circuit controls a block of memory in its node. Typically, part of the memory is in the interface circuit and part of the memory is in the local RAM. The allocation of memory on a given node in prior art systems is controlled by the interconnect interface and/or processor on the node in question. If the available memory is full or the processor is too busy with higher priority tasks to process an coming message on the interface, the message is lost in prior art systems.

In a system utilizing an interconnect interface according to the present invention, each potential sender manages part of the memory on the recipient. This memory is used to store data sent by the sender. Consider a message from node 12 to node 14 which is used to instruct a process on node 14 to carry out a particular task for a process on node 12. The interconnect interface on node 12 "knows" that there is space for the message in node 14, since the interconnect interface on node 12 manages the block of space in which the message will be inserted. When the process on node 14 completes its task, the recipient process normally sends a "done with task" message. This message may also be used to signal the interconnect interface on node 12 that the memory used for the message that initiated the task is now free. Hence, the interconnect interface on node 12 always knows the status of the memory allocated to it on each potential recipient. Since the sender knows the status of the sender's resources on the recipient, the sender can avoid sending a message when there is insufficient memory allocated on the recipient to receive the message. Hence, the problem of a message being lost for lack of space on the recipient is solved by the present invention.

An interconnect interface according to the present invention also prevents host interruption when the host is too busy to service an interrupt signaling that a new message has arrived. In a data processing system utilizing the present invention, the interconnect interface interrupts the processor at its node only if the processor is not working on an interface derived task. If the host processor is already working on a task sent via the interconnect interface, the new message is added to a work queue without interrupting the host processor. Embodiments of the present invention, in which interrupts are sent to the host processor if the host processor is working on an interface derived task having a lower priority than the task being executed, will also be apparent to those skilled in the art.

Figure 2:
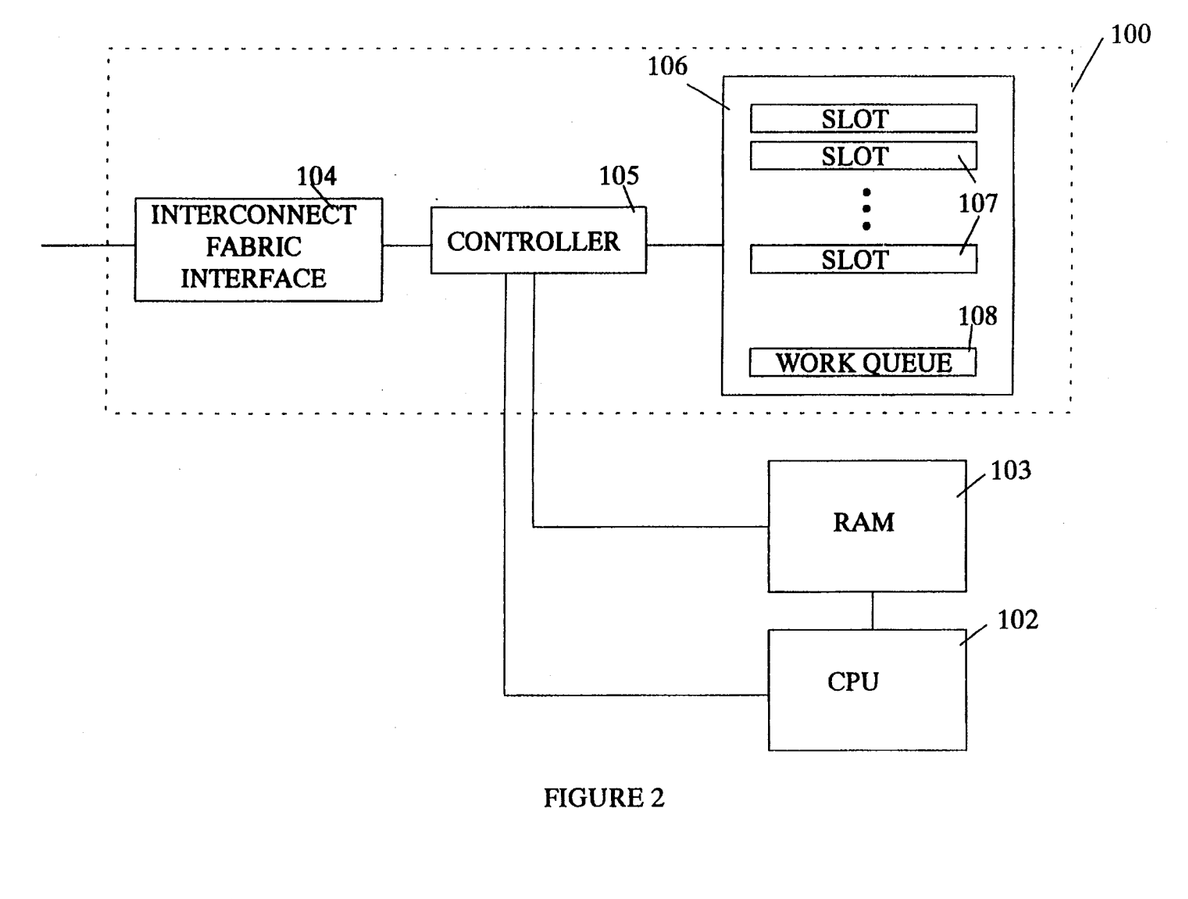
FIG. 2 is a more detailed block diagram of the portion of an interconnect interface 100 according to the present invention which receives messages.

Refer now to FIG. 2 which is a more detailed block diagram of the portion of an interconnect interface 100 according to the present invention which receives messages from an interconnect fabric for a processor which includes a central processing unit (CPU) 102 which utilizes a local RAM 103 for the storage of data and programs. Interconnect interface 100 includes an interface 104 for receiving and transmitting messages on the interconnect fabric. Interface 104 manages the various protocols that are needed to actual send data on the interconnect fabric. Since such interfaces are well known to the arts, the details of interface 104 will not be given here. Interconnect interface 100 also includes a controller 105 that executes the various logical operations described below. Controller 105 is also conventional in the art.

Interconnect interface 100 also includes its own local memory 106 which is used to store information related to incoming messages. Memory 106 includes a plurality of records referred to as "slots". Exemplary slots are shown at 107. Each slot stores information that describes the message area in RAM 103 that is allocated to a specific processor connected to interconnect interface 100 on the interconnect fabric. The information stored in a slot includes the address in RAM 103 at which messages from the processor in question are to be stored and the amount of space allocated.

Each slot also includes a protection key which provides protection against misdirected messages. The protection is provided by requiring that each incoming packet in a message has the same protection key as that stored in the slot specified in the message.

Each slot also includes space to store information specifying the structure of a received message that is controlled by the data in the slot. For a given message, this space may be viewed as being divided into two sub-groups of values. The first sub-group specifies the particulars of a received message. This includes the length of the message and where the message begins relative to the beginning of the memory block controlled by this slot. The second sub-group is used to control the receipt of multi-packet messages.

While the above-described embodiments utilize a slot "table" that is stored in the interface memory 106, it will be apparent to those skilled in the art that the actual table may be stored in the host memory 103. In this case, entries from the slot table can be moved in and out of memory 103 in a manner analogous to that used in cache memories.

Long messages are typically broken into packets which are transmitted separately over the interconnect fabric. Many interface fabrics have unpredictable transit times that change from packet to packet; hence, packets for a given message may arrive out of order. Consider the simple case in which only one message is being sent at a time to a given slot. Controller 105 must be able to determine when the message is complete. To aid controller 105 in this task, each slot includes a message identification field and a field for a counter which keeps track of the packets remaining to be received for the message having the identification value stored in the message identification field. When the sender sets up the message transfer, the message identification and packet counts are loaded into these fields.

The arrival of a new message is detected by the packets remaining count being zero. The new message arriving will have a packets-in-message count which is non-zero. This packet causes the packets remaining counter to be appropriately set to the count corresponding to the new message and the message identification field to be reloaded. Each successive packet for this message causes the count to be decremented. As will be discussed in more detail below, the interconnect interface can not assume that the packets of a message will be received in any known order since any packet may be delayed in the interconnect fabric. Hence, each packet repeats all of the crucial information needed to setup the slot information. For example, each packet includes the number of packets in the message, the packet number of the packet in question, the message identification value, and the protection key.

The message identification field is used to avoid errors during message re-sends. If an error occurs in the transmission of the message, the sender is instructed to re-send the message. The receiver must guard against a packet from the previous attempt arriving during the re-send and erroneously decrementing the packets remaining counter. Such a situation can arise when one of the packets of the previous message is delayed in the interconnect fabric. To avoid such a situation, the message identification field is reloaded at the beginning of each new message. Since the late packet from the previous message has a different value in its message identification field, the late packet is ignored.

The above description assumed that only one message was in progress per slot. In cases in which multiple messages are allowed to be in progress for each slot, each slot contains a plurality of message identification and packet count fields, one per allowed message. An offset in memory 103 and message length field is also included for each of the possible multiple messages.

In addition, a message count is stored for each slot when multiple messages are present. This message count allows the sender to specify that notification of the arrival of messages to host CPU 102 is to be made only after the indicated number of messages has arrived. The default value for this field is zero, i.e., notify receiver on each incoming message. If the count is set to a value greater than zero, then the count is decremented on each completed message, and notification is only made when the count reaches zero.

When a message has been completely received, controller 105 places a notification record in work queue 108. If CPU 102 is already occupied responding to a previous message, no interrupt is generated. In this case, CPU 102 is programmed to check the work queue after finishing a task received via the work queue. If CPU 102 was not working on an interconnect interface derived task when the message is completed, CPU 102 generates an interrupt for CPU 102 to notify the CPU that a message is waiting.

Controller 102 also checks incoming messages for various protocol errors. For example, a request to send a message that is too long for the memory area assigned to the processor, a packet with the wrong protection key, etc. Error conditions are preferably handled by the recipient of a message rather than the sender. If an error is detected at the receiver, the receiver's operating system is notified so that it may take action to prevent further problems from being generated by the sender. If the sender has a problem that is generating erroneous messages, it is preferable that the receiver of the message be the one that indicates the existence of such a condition to the portion of the operating system that manages the multi-processor environment. This portion of the operating system may then take actions to re-boot the faulty node. If sender is making such errors, it can not be relied upon to correct them by itself. In fact, the errors may be the result of a malicious process on the sending node. In the later case, control must be taken away from the sending the node.

While the above-described embodiments utilize a single work queue that is stored in the interconnect interface, it will be apparent to those skilled in the art that multiple work queues having different priorities may be used. In addition, the actual work queues may be located in the host memory. In this case, pointers to the work queues would be stored in the interconnect interface.

The above-described embodiments of the receive portion of an interconnect interface according to the present invention are best utilized for small messages, because these embodiments require that physical memory in local RAM 103 be allocated for each valid possible sender for the entire time period in which the sender could send a message. The amount of memory must be sufficient to receive the longest message anticipated from the corresponding sender.

For large data transfers, an interconnect interface according to the present invention preferably uses a protocol in which space is allocated immediately before sending. In this situation, the sender sends a message to the operating system on the receiving side requesting space. The operating system on the receiving side allocates space and places the information describing it in a new slot. The slot number and protection key are then returned to the would-be sender for use in performing the transfer. When the data is processed at the receiver, the slot may be reassigned and the memory returned to other uses.

At startup, each node allocates a minimal amount of memory to service messages from each other node in the system and initializes corresponding slots in memory 106 to point to these memory blocks. Hence, each node will be ready to receive messages from every other node when the system is powered up. These initial slots will be referred to as bootstrap slots.

The keys chosen for the bootstrap slots will be a function of the sending node address for which the slot is being allocated. The initial keys are chosen such that any node can calculate the keys; however, the number of used keys out of the possible keys is assumed to be sufficiently small that the probability of a bad node accidentally generating a key is small. The first action of a new node should be to negotiate a change in these keys to ones that are derived in a less predictable manner. This will then provide security against a malicious process on a node (e.g., a virus) being able to send messages to other nodes.

Dynamic addition of nodes to a running system can be accomplished in the same way as the regular bootstrap. A node cannot determine the difference between a node that is not communicating with it and one that has been removed (or never added) to the system. Hence, new nodes can always be added if each node has reserved memory and a slot for all nodes that might potentially exist in the system.

If the maximum number of nodes is large, but the number of active nodes is small, this procedure can waste an unacceptable amount of memory on each node. To avoid this waste, a few nodes can be designated as "boot servers". Memory is allocated on these nodes for all possible nodes. The boot servers determine which nodes are defined to be active. The other nodes reserve slots only for the nodes known to be active. When a new node is brought on-line, the new node searches the system for a boot server that will respond to it. The boot server then communicates the new node's existence to other nodes which proceed to allocate a slot for communications between operating systems on the nodes.

When a process running on one node wishes to send messages to a process operating on another node, the would-be sending process makes a setup request to the operating system on its node. The operating system establishes a slot on the sender's node for return messages and then sends a message via the operating system to operating system slot setup during startup to the operating system on the receiving node. The operating system on the receiving node then establishes a slot for the sending process, and informs the receiving process of the slot number on the sender that it controls.

Having provided the above explanation of how an interconnect interface according to the present invention receives messages from another interconnect interface, a more detailed discussion of the data structures and control registers utilized by an interconnect interface at both senders and receivers will now be given. In a data processor utilizing the present invention, all communication is performed through end-points, referred to as termini. A block diagram of the preferred embodiment of an interconnect interface according to the present invention is shown at 300 in FIG. 3. Interconnect interface 300 has one receiving terminus 302 and one or more sending termini 303. All of the termini share a single memory mapping table to reference locations in the host computer memory and to make the various registers used in the present invention appear as memory addresses in the host computer. Thus the host computer can read and write the various registers via load and store operations, respectively. The memory mapping table also provides a means for limiting access to the various registers. By assigning the registers to addresses that are only accessible to the operating system, the ability of an errant process to corrupt the registers is significantly reduced. Hardware interface 308 provides the interface to the interconnect fabric.

Figure 3:
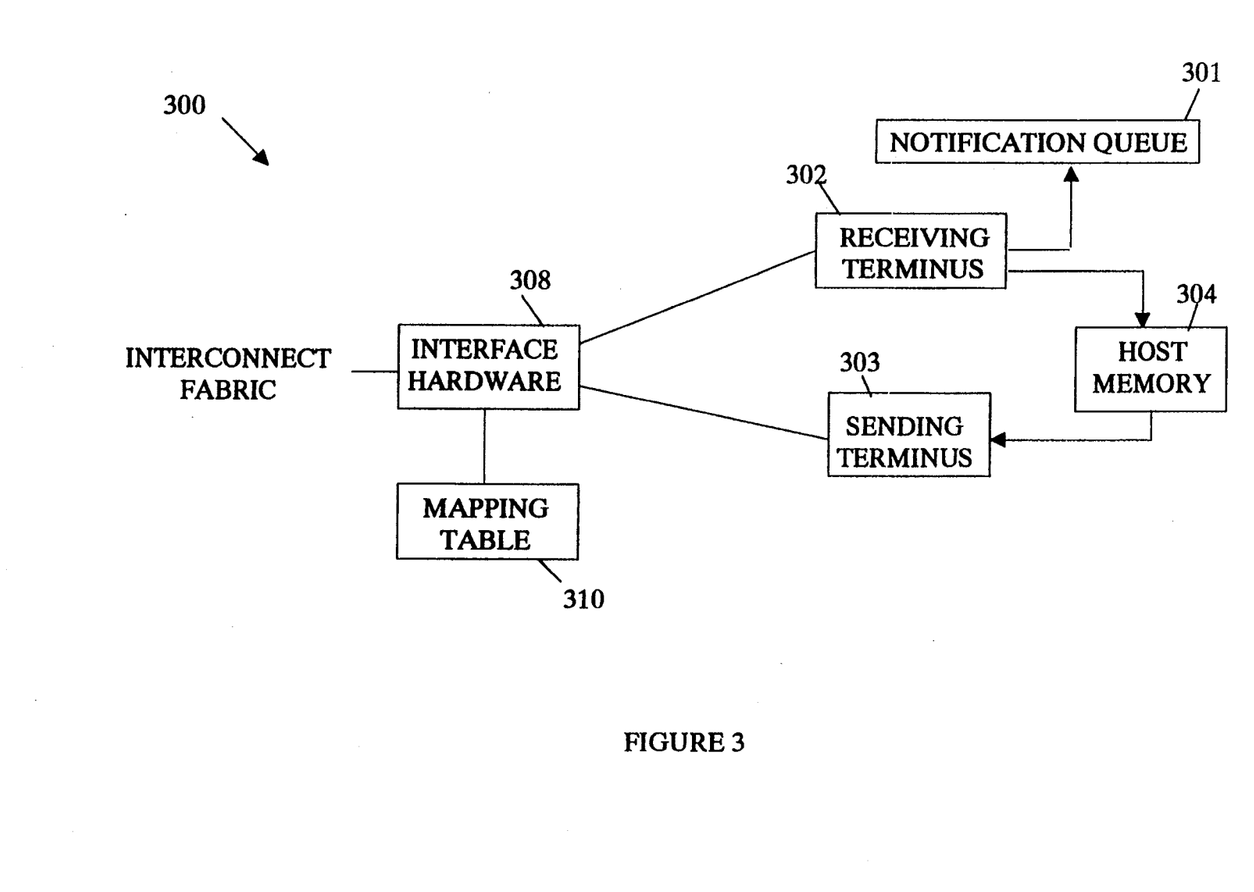
FIGS. 3 is a block diagram of the preferred embodiment of an interconnect interface according to the present invention.

In general, the termini store or extract messages received or to be sent from the host computer memory 304, respectively. This arrangement reduces the cost of transferring the messages to intermediate buffers in the various termini. The interface hardware shown in FIG. 2 at 100 and discussed above is an example of a receiving terminus.

The preferred embodiment of the present invention utilizes sending termini that may operate in two different modes, referred to as DMA mode and direct mode. A block diagram of a sending terminus is shown at 400 in FIG. 4. The various operations carried out by sending terminus 400 are controlled by controller 401. In DMA mode, the sending terminus works from an input queue 408 which is preferably part of the host computer system memory. As will be explained in more detail below, input queue contains a list of descriptors that specify the location of messages in the host computer memory that are ready to be sent over the interconnect fabric. These messages are processed in the appropriate order by controller 401. In direct mode, a single message that is to be sent over the interconnect fabric is identified by the contents of register set 406. The message is stored in one or more FIFO buffers of which buffer 409 is typical. The direct mode is typically used for short messages requiring low latency.

Figure 4:
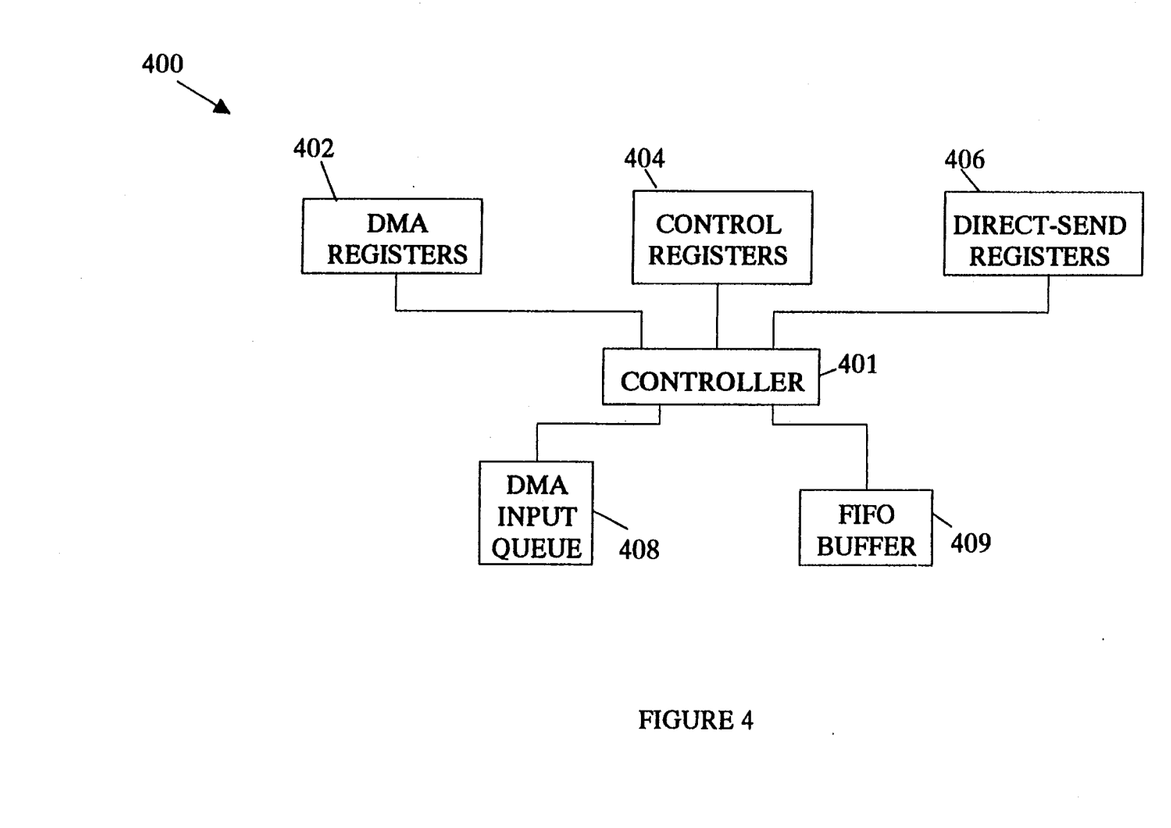
FIG. 4 is a block diagram of a sending terminus according to the present invention.

As noted above, security issues are very important in a multi-computer system in which multiple processes may be running on each node of the system. The system must be protected against an errant process on one node masquerading as a different process and corrupting data stored on other nodes in the system. One method used by the present invention to insure the security of communication is the inclusion of a protection key in each message. The value of the protection key in the message must match the value of the corresponding entry in the receiving terminus of the receiving node. To ensure that an errant process can not insert a protection code into a message, the protection code is inserted by controller 401 by copying a value stored in a control register included in control register set 404. This register may only be written by the operating system on the node connected to the sending terminus. Since the protection key register is accessed only by "trusted" operating system software, the ability of a process running on one node being able to corrupt a process on another node by sending errant messages is greatly reduced.

When operating in DMA mode, a terminus transfers messages directly from the host memory to the interconnect fabric. A set of registers 402 is provided for storing various values needed for the operation of this mode. A list of transfer tasks to be completed by the terminus is stored in a DMA input queue 408 which is located in the node's local RAM. Each task includes a description of a message to be sent via the terminus. This description will be referred to as a send-work-descriptor in the following discussion. Data specifying the location and size of the queue is stored in a register in register set 402. This information is written only by the operating system. The registers in set 402 include a pointer to the physical address of the last send-work-descriptor that was examined by the terminus in the DMA input queue.

The contents of a send-work-descriptor in the preferred embodiment of the present invention may be divided into four fields. The first field identifies the intended receiver. This includes the node identification of the receiver, the number of a slot in the receiver's memory receive terminus, and an offset specifying the address at which the message in question is to be placed in the receiver message space. The second field identifies a pointer to a physical address in the sender's memory and the offset of the message in the sender message space specified by this pointer. The third field is used to specify the message type. In the preferred embodiment of the present invention, the message may be either a send or a "remote-get" message. A remote-get message causes a copy of a specified area in the recipient's memory to be sent back to the sender. This protocol is equivalent to a message requesting data from the recipient followed by a return message containing the data. However, in this case, the interface hardware at the recipient generates the return message without disturbing the recipient. Finally, the last field specifies the length of the message and an identification code used for notification of the recipient.

Register set 402 also includes a group of registers for storing the physical address of the start of the DMA input queue 408 and the length of the queue. These registers are written by the operating system. DMA registers 402 also include a current position pointer which specifies the physical address of the last send-work descriptor that the interface has begun processing in the queue.

Register set 402 also include status registers for storing error data if any of a number of exceptions occur during the processing of a message, a register for storing the priority level for the terminus in question, and a register for indicating the status of the current task. Each sending terminus has an associated priority. In the preferred embodiment of the present invention, two priority levels are used, one for high-priority traffic such as control messages and one for lower priority traffic such as bulk data transfers. The priority is imposed at the packet level. That is, a higher-priority message will take precedence over a lower-priority message at the next packet boundary. The register specifying the priority of the terminus is only writable by the operating system in the preferred embodiment of the present invention.

Register set 402 also includes a control register for initiating the operation stored therein. When an appropriate code is written into this register, controller 401 will commence the transmitting operation identified by the code.

In the preferred embodiment of the present invention, the list of work items in DMA input queue 408 is formatted as a circular vector in a contiguous block of physical memory. The terminus operates by starting at the first send-work-descriptor, processing it, and then proceeding on to the next one. When the terminus reaches a send-work-descriptor with a node identification of 0, it ceases work and waits for input from the processor in the node before continuing. If the terminus reaches the end of the vector, the terminus wraps around again to the first address in the vector.

It will be apparent to those skilled in the art that there are a number of different possible arrangements for organizing communications between each terminus and the host processor using list structures. Any structure that allows the host processor to determine the state of the various termini in the interface may be used without departing from the present invention.

As noted above, direct mode is used for sending short messages which require low-latency. In the preferred embodiment of the present invention, these messages are either short control messages or Fetch-and-Op messages. A Fetch-and-Op message returns the contents of a specified location in the recipient's memory and causes the recipient to perform some operation on one or more operands that are part of the message. A direct terminus includes additional control registers 406 that are mapped into the address space of the application and accessed directly by the application using load/store instructions. The additional registers store the information normally provided in a send-work-descriptor. Instead of specifying the address in local RAM at which the message is stored, the identity of a FIFO buffer 409 in which the message is stored is provided. The register set also includes a set of status registers which indicate the type of activity in progress, error data if an exception has occurred, and a register indicating whether or not a result is available from a Fetch-and-Op operation. The register set includes a register to hold the return value from the last Fetch-and-Op.

To send a message using a direct terminus, the local processor waits until the terminus is idle. The receiver's node, slot, start address, and notification data are then written into the control registers in the direct terminus. The packet to be sent is then written into FIFO buffer 409. This can be accomplished either as sequence of single-word store operation into a single address, or a cache-line-flush operation to emit several bytes at once. Finally, a send command is written into a control register in the terminus.

A remote Fetch-and-Op is performed in a manner similar to a send operation, except that the operands are provided in place of a message body, and the result of the operation will usually need to be retrieved once the operation has been completed. The procedure is the same as that described above except that the operands are written in FIFO 409, an OP command is written into the control register. When the status register devoted to Fetch-and-Op messages indicates that the result is ready, a message is sent to the recipient requesting the result.

The number of active sending termini in an interconnect interface according to the present invention can vary dynamically up to a maximum number set by the hardware. This provides a method for trading hardware cost against system performance. Large systems, or systems where low-latency interconnects are particularly important, can employ more termini and suffer the added hardware costs. Smaller systems with less stringent needs can achieve adequate performance with only a few termini. If a system has a need for more termini than provided in hardware, the operating system can utilize software multiplexing to effectively increase the number of termini; however, such increases will inflict a much higher cost in terms of performance on the node.

A terminus can be active in both direct and DMA mode simultaneously. Direct-mode transfers are treated as if they were inserted at the head of the DMA queue. In the preferred embodiment of the present invention, separate protection key registers are provided in set 404 for each mode.

The basic terminus operation is asynchronous. The initiator requests a transmission and, if needed, performs a rendezvous with a result some time later. For "send" operation, the rendezvous may not need to be explicit.

A "remote-get" operation requires the termini to operate in a more synchronous mode. In this case, the sending terminus is blocked until the "get" returns. The send-work-descriptor is assembled as the body of the message, and the message is sent with an operation type of "remote-get". When the message arrives at the receiver, it is used to generate a return message from the sender. When the message arrives at the receiver, it is put into a buffer reserved for such messages and given an appropriate priority level. The requester's priority level is used in the preferred embodiment of the present invention. The function field of the message is forced to the value "send". The send is actually processed by the local interconnect interface hardware when there are no more higher-priority messages.

The receiver terminus is concerned almost solely with the support of the notification system and its associated queue. The notification queue is managed in a manner analogous to that used to process DMA requests. However, in this case, it is the local processor that indicates to the interface how far it has progressed in handling the items in the notification queue, and whether it has finished processing the current set of notifications. This data exchange is handled by writing a register with part of the receiving terminus.

When a message is received, the receiving terminus writes the data describing the message into the next free slot in notification queue 301. The message entry includes the slot number of the slot in the receiving terminus that generated the notification, a message identification tag, the location of the message in the message area, and the length of the message. If, and only if, the processor has indicated that it is finished processing the entries in the queue, an interrupt is generated in the preferred embodiment of the present invention. As the processor deals with a notification, it clears the values in the notification queue slot to indicate to the interface that the entry is available for reuse.

In the preferred embodiment of the present invention, notification queue 301 is divided into a plurality of tables. Each table has a different priority level. The processor completes actions on the highest priority table first.

It will be apparent to those skilled in the art that the present invention may be constructed from a microprocessor or special purpose hardware comprising conventional ASIC cells and/or gate arrays.

Various modifications to the present invention will become apparent to those skilled in the art from the foregoing description and accompanying drawings. Accordingly, the present invention is to be limited solely by the scope of the following claims.

What is claimed is:

1. An interconnect interface for connecting a host computer having a local memory to an interconnect fabric in a multi-computer data processing system including a plurality of such host computers connect to said interconnect fabric over which said host computers communicate with each other, each said host computer communicating with other said host computers having similar interconnect interfaces by sending messages on said interconnect fabric, each said message comprising one or more packets, each packet including a packet body, packet identification information, a protection key and a slot identification value, said interconnect interface comprising:

interface means for providing connections to said interconnect fabric and said host computer;

a receiving terminus connected to said interface means for receiving messages from said interconnect fabric, said receiving terminus including:

slot table means for storing a plurality of records, each said record corresponding to a possible one of said slot identification values, each said record corresponding to a possible sender of messages on said interconnect fabric, said sender being identified by said slot identification value, each said record including information identifying a corresponding area in said memory of said host computer, a protection key, and information specifying the structure of an incoming message; and receiving control means connected to said interface means for processing incoming messages to said interconnect interface, said receiving control means causing said packet body to be stored in said memory area of said host computer identified in said record corresponding to said slot identification value in said incoming message if said protection key in said packet matches said protection key stored in said record.

2. The interconnect interface of claim 1 wherein said receiving control means further comprises:

means for storing a list of messages that are awaiting processing by said host computer; and means for causing an entry to be made in said list of messages awaiting processing when all packets in an incoming message have been stored in said memory area of said host computer.

3. The interconnect interface of claim 2 wherein said receiving control means further comprises means for interrupting said host computer when all packets in an incoming message have been stored in said memory area of said host computer if and only if said host computer is not processing a message specified by said list of messages.

4. The interconnect interface of claim 1 further comprising a send terminus for transmitting messages on said interconnect fabric, said send terminus comprising:

a protection register for storing a send protection key to be included in all packets of messages sent by said terminus;

message identification means for specifying the location of a message to be sent on said interconnect fabric and the intended recipient of said message; and send control means generating and sending packets containing said specified message on said interconnect fabric, each said packet including said send protection key and a slot identification value specifying a record in said slot table means on said interconnect interface attached to said recipient of said message.

5. The interconnect interface of claim 4 wherein the contents of said protection register may only be changed by the operating system of said host computer connected to said interconnect interface.

6. The interconnect interface of claim 4 wherein said message identification means comprises:

means for specifying the location of an input job queue, said input job queue comprising a plurality of work-descriptor records, each said work-descriptor record including information specifying the intended receiver of a message, a record in said slot table means and the location of said message in said host computer; and DMA pointer means for storing a pointer to one of said work-descriptor records in said input job queue.

7. The interconnect interface of claim 6 wherein said means for specifying the location of said input job queue comprises means for storing the address of said input job queue in said host computer and wherein said address can only be changed by the operating system of said host computer.

8. The interconnect interface of claim 4 wherein said message identification means comprises receiver identification means for storing information specifying the intended receiver of a message, a record in said slot table means, and a buffer in which said message is stored.

9. The interconnect interface of claim 8 further comprising one or more FIFO buffers and where said buffer specified by said receiver identification means comprises one of said FIFO buffers.

10. A method for communicating between processor nodes in a multi-computer data processing system including the processor nodes and an interconnect fabric over which the processor nodes send and receive messages to communicate with each other, comprising the steps of:

(a) sending a message from a first processor node to a second processor node, the message including at least one packet, the packet having a packet body, a send protection key, and a slot identification value, said slot identification value identifying a process on said first processor node;

(b) determining, at the second processor node, if the send protection key contained in the packets of the message incoming from the first processor node matches a stored protection key stored at the second processor node; and (c) when said determining step (b) determines that the send protection key matches the stored protection key, storing the packet body of the message incoming from the first processor node to a local memory storage area of the second processor node, the local memory storage area being identified using the slot identification value contained in the packets of the message incoming from the first processor node.

11. The method of claim 10 wherein the slot identification value identifies a record in a slot table within the second processor node, the record including at least information identifying the local memory storage area and the stored protection key.

12. The method of claim 11 wherein the record further includes information specifying the structure of an incoming message.

* * * * *